United States Patent Office 3,297,551
Patented Jan. 10, 1967

3,297,551
DETERMINATION OF OXYGEN IN FLUIDS
Charles Benjamin Alcock, Pittsburgh, Pa., assignor to United Kingdom Atomic Energy Authority, London, England
No Drawing. Filed Jan. 4, 1962, Ser. No. 164,406
Claims priority, application Great Britain, Jan. 9, 1961, 848/61
4 Claims. (Cl. 204—1)

This invention relates to the determination of the oxygen content of fluids and has one application in the determination of the oxygen content of reactor coolants.

In nuclear reactors the oxygen content of the coolant has to be kept low to reduce corrosion of the reactor structure and fuel element canning material to an acceptable level. It is therefore desirable to monitor continuously the oxygen content of the coolant.

According to the present invention the oxygen content of a fluid is determined by measuring the E.M.F. across an electrolytic cell whereof one electrode comprises the fluid itself, the other electrode is an oxygen reference electrode and the electrolyte is a solid oxygen-containing anionic conductor having negligible electronic conductivity at the temperature of the measurement.

The present invention is based on the fact that the E.M.F. across a cell of the type: A/anionic conductor/B is given by the expression:

$$E = \frac{RT}{4F} \ln \frac{[O_2(A)]}{[O_2(B)]}$$

where $[O_2(A)]$ and $[O_2(B)]$ are the thermodynamic activities of oxygen in mixtures A and B respectively, R is the gas constant, T is the absolute temperature, F is Faraday's constant, and the anonic conductor is a purely electrolytic conductor having negligible electronic conduction at the temperature of measurement.

Where A or B is an ideal mixture of gaseous oxygen and a gaseous substance which is inert to oxygen at the temperature of measurement, the activity of oxygen in A or B will be equal to the partial pressure of oxygen in A or B.

Where A or B is an intimate mixture of a substance and the first oxidation product formed by the substance in the presence of oxygen at the temperature of measurement, then the activity of oxygen in A or B is equal to the oxygen dissociation pressure ($pO_2$) of the mixture. Thus if A is an intimate mixture of a metal M and its lowest stable oxide (MO) at the temperature of measurement, and B is an intimate mixture of a metal X and its lowest stable oxide (XO) at the temperature of measurement, then the cell is of the type /(M/MO)/anionic conductor/(X/XO), and the E.M.F. of the cell is given by the expression:

$$E = \frac{RT}{4F} \ln \frac{pO_2 \ (X/XO)}{pO_2 \ (M/MO)}$$

In the present invention one electrode is an oxygen reference electrode and the other electrode comprises the fluid whose oxygen content is to be determined. Provided that, in the case where the fluid is a liquid, the maximum oxygen content of the fluid is small, i.e. less than about one atomic percent, then the E.M.F. across the cell is proportional to the logarithm of the oxygen content of the fluid.

The invention is therefore applicable to the determination of the oxygen content of a wide variety of fluids, and in particular to: (i) gases which are chemically inert to oxygen at the temperature of measurement, e.g. helium; (ii) gases which may react with oxygen at the temperature of measurement to form an oxide thereof, e.g. nitrogen; and (iii) liquid metals which may react with oxygen at the temperature of measurement to form dilute solutions of oxide in the metal, or separate oxide phases, e.g. liquid alkali metals and molten lead.

The cell may, for example, take the form of a crucible made of the anionic conducting material and suspended in the fluid, e.g. helium, nitrogen, liquid alkali metal or molten lead, so that the wall of crucible acts as the electrolyte and is impermeable to the fluid. Suitable crucible materials include the pure oxides thoria and zirconia, and solid solutions in these oxides of the alkaline earths or rare earths, e.g. lime or yttria. The crucible contains the reference oxygen electrode which may consist of a gas having a fixed oxygen content or a liquid metal in equilibrium with its lowest oxide, i.e. saturated therewith.

In the case where the oxygen content of a liquid metal is to be measured, the reference electrode may consist of the liquid metal saturated with its lowest oxide. The E.M.F. is then a maximum when the oxygen content of the liquid metal is zero, and decreases as the oxygen content increases. Thus if the oxygen content of the liquid metal changes at 600° C. from 5 p.p.m. to 4 p.p.m., the E.M.F. would change by $RT/2F \ln 5/4$, i.e. about 8 mv., which is readily detectable.

Electrical connections are made to the reference electrode inside the crucible and to the fluid outside the crucible and the E.M.F. between these connections are measured.

The E.M.F. may be measured by any suitable means. It is important, however, that the means for measuring the E.M.F. should not take a current from the cell which is large enough to disturb the equilibrium conditions in the electrodes. Since the resistivty of the electrolyte is high (from $10^2$ to $10^8$ ohm-cm., according to the temperature and the composition of the electrolyte) the means for measuring the E.M.F. may have to have a very high impedance. The resistivity of a number of electrolytes is shown in the following table:

*Approximate resistivity in ohm-cm.*

| Temperature (° C.) | 300 | 400 | 500 | 600 | 700 | 800 | 1,000 | 1,200 |
|---|---|---|---|---|---|---|---|---|
| Pure thoria | | $3 \times 10^9$ | $2 \times 10^8$ | $2 \times 10^7$ | $3 \times 10^6$ | $7 \times 10^5$ | $7 \times 10^4$ | $1.5 \times 10^4$ |
| 8% yttria in thoria | $10^9$ | $3 \times 10^7$ | $2 \times 10^6$ | $2 \times 10^5$ | $5 \times 10^4$ | $10^4$ | $1.5 \times 10^3$ | |
| 22% yttria in thoria | $2 \times 10^8$ | $10^7$ | $9 \times 10^5$ | $1.5 \times 10^5$ | $4 \times 10^4$ | $10^4$ | $1.5 \times 10^3$ | |
| 15% lime in zirconia | $5 \times 10^8$ | $1.5 \times 10^7$ | $8 \times 10^5$ | $9 \times 10^4$ | $2 \times 10^4$ | $4 \times 10^3$ | $5 \times 10^2$ | |

Using pure thoria at any temperature below about 1200° C., or any of the other three materials at temperatures below 700° or 800° C., the E.M.F. should be measured with a high impedance instrument, such as a vibrating reed electrometer, which has an impedance of $10^{14}$ to $10^{16}$ ohms. Above these temperatures, an instrument of lower impedance such as a thermocouple potentiometer could be used.

Such instruments could be used either as deflection or as null instruments. Use in the latter method could be achieved by applying a fixed opposing voltage, such that the resultant voltage would be zero when a selected critical oxygen content of the fluid was reached. Alternatively, it would be possible to use as the reference electrode a sample of a metal containing, either as oxygen in homogeneous solution therein or as an intimate mixture of the metal with its lowest oxide, the critical amount of oxygen above which rapid corrosion of that metal occurs. The polarity of the reference electrode would then reverse in sign as the fluid changed from the safe to the unsafe condition from the point of view of the corrosion of that metal.

It should be noted that the presence of other elements in the fluid whose oxygen content is to be measured, such as alloying elements in a liquid metal, in no way interfere with the value of the method, since the method gives a measure of the oxygen thermodynamic activity, i.e. the effective oxygen content and not necessarily the gravimetric oxygen content. It is the former which determines the corrosive power of the fluid.

The method of the invention has particular application to the determination of the oxygen content of a liquid alkali metal coolant in a fast neutron nuclear reactor, since the presence of oxygen in such coolants may cause rapid corrosion of nuclear fuel element canning materials, such as niobium and vanadium. It may be necessary to maintain the oxygen content of a liquid alkali metal coolant below 10 parts per million. The method of the invention provides effective means for measuring the oxygen content of liquid alkali metals in the range from 1 to 10 parts per million. The E.M.F. of a cell, in which the reference electrode comprises a saturated solution of sodium monoxide in sodium and the other electrode comprises liquid sodium of variable oxygen content, decreases from about 220 mv. to 150 mv. as the oxygen content increases from 1 to 10 parts per million.

It is preferable to control the temperature of the fluid in contact with the electrolyte to within narrow limits, since temperature variations will cause changes in the E.M.F. A 10° variation of temperature around 500° C. causes a change in E.M.F. which corresponds to about 12% variation in the oxygen content of liquid sodium in the range 1 to 10 parts per million at the same temperature.

As an example of the determination of the oxygen content of fluids by the present invention, there will now be described the determination of the oxygen content of molten lead by measuring the E.M.F. of a cell in which one electrode comprises the molten lead.

The electrolyte was in the form of a flat-bottomed crucible 8 mm. high, 9.5 mm. outside diameter and 1 mm. wall thickness, with the rim and base ground flat, and consisted of a 10% solid solution of calcium oxide in zirconia. The base rested on a pellet of a mixture of nickel and nickel oxide or a mixture of copper and copper oxide. A weighed quantity of lead (about 0.5 g.) was placed in the crucible, which was closed with an iridium disc. Electrical connections to either side of the cell were made by platinum discs attached to platinum wires. The whole cell was placed in an atmosphere of purified argon and heated to 700° C. Measured quantities of electricity were passed through the cell to transfer known amounts of oxygen into the lead, using currents of $4 \times 10^{-4}$ amp or less to avoid polarization. The E.M.F. of the cell was measured for values of the oxygen content of the lead from 1.3 parts per million to the saturation point at 120 parts per million (which is the solubility of lead monoxide in liquid lead at 700° C.) by means of a vibrating reed electrometer having an input insulation resistance of $10^{16}$ ohms and a discrimination of 1 mv. Results are shown in the following table.

| P.p.m. oxygen in liquid lead | E.M.F. (mv.) |
|---|---|
| 1.3 | −31 |
| 2 | −10 |
| 5 | +26 |
| 10 | +54 |
| 20 | +81 |
| 50 | +118 |
| 100 | +145 |
| 120 (saturation) | +152 |

A plot of the E.M.F. against the logarithm of the atomic concentration of oxygen showed a linear relation, the E.M.F. increasing at the rate of 30 mv. for each increase in the atomic concentration of oxygen by a factor of 2 up to the saturation point.

I claim:
1. A method of determining the oxygen content of a liquid consisting essentially of at least one metal selected from the group consisting of alkali metals and lead, which method comprises measuring the E.M.F. across an electrolytic cell whereof one electrode comprises the said liquid metal, the other electrode is an oxygen reference electrode comprising an intimate mixture of a metal and its lowest stable oxide at the temperature of measurement, and the electrolyte is a solid anionic conductor having negligible electronic conductivity at the temperature of measurement and being selected from the group consisting of thoria, zirconia, and solid solutions thereof with oxides selected from the group consisting of alkaline earth metal oxides and rare earth metal oxides.

2. A method according to claim 1 wherein said E.M.F. measurement utilizes a null point potentiometer having a null point corresponding to a maximum acceptable oxygen content.

3. A method of determining the oxygen content of a liquid alkali metal reactor coolant in a fast neutron nuclear reactor comprising measuring the E.M.F. across an electrolytic cell whereof one electrode comprises the said liquid alkali metal, the other electrode is an oxygen reference electrode comprising an intimate mixture of a metal and its lowest oxide stable at the temperature of measurement and the electrolyte disposed therebetween is a solid anionic conductor having negligible electronic conductivity at the temperature of measurement and being selected from the group consisting of thoria, zirconia and solid solutions thereof with oxides selected from the group consisting of alkaline earth metal oxides and rare earth metal oxides.

4. A method according to claim 1, in which the oxygen reference electrode comprises the said liquid metal saturated with its lowest stable oxide at the temperature of measurement.

References Cited by the Examiner
UNITED STATES PATENTS 3,057,945  10/1962  Rinnovatore et al. _____ 136—89

OTHER REFERENCES

Kinkkola et al.: "Journal of Electrochemical Society," vol. 104, No. 6, June 1957, pages 379–386.
Horsley: "AERE Report R3037," 1961.

JOHN H. MACK, *Primary Examiner.*
JOHN R. SPECK, WINSTON A. DOUGLAS,
*Examiners.*

T. H. TUNG, *Assistant Examiner.*